United States Patent
Hartlieb et al.

(10) Patent No.: US 11,768,731 B2
(45) Date of Patent: Sep. 26, 2023

(54) SYSTEM AND METHOD FOR TRANSPARENT REGISTER DATA ERROR DETECTION AND CORRECTION VIA A COMMUNICATION BUS

(71) Applicant: Infineon Technologies AG, Neubiberg (DE)

(72) Inventors: Heimo Hartlieb, Graz (AT); Christian Heiling, Graz (AT)

(73) Assignee: Infineon Technologies AG, Neubiberg (DE)

( * ) Notice: Subject to any disclaimer, the term of this patent is extended or adjusted under 35 U.S.C. 154(b) by 228 days.

(21) Appl. No.: 16/402,532

(22) Filed: May 3, 2019

(65) Prior Publication Data
US 2020/0349001 A1 Nov. 5, 2020

(51) Int. Cl.
*G06F 11/10* (2006.01)
*G06F 13/42* (2006.01)
*G06F 13/16* (2006.01)

(52) U.S. Cl.
CPC ...... *G06F 11/1048* (2013.01); *G06F 13/1605* (2013.01); *G06F 13/4204* (2013.01); *G06F 13/4282* (2013.01); *G06F 2213/0002* (2013.01)

(58) Field of Classification Search
CPC ............ G06F 11/1044; G06F 11/1048; G06F 13/1605; G06F 13/4204; G06F 13/4282; G06F 2213/0002
See application file for complete search history.

(56) References Cited

U.S. PATENT DOCUMENTS

| | | | | |
|---|---|---|---|---|
| 4,916,704 A | * | 4/1990 | Bruckert | G06F 11/165 714/11 |
| 5,404,462 A | * | 4/1995 | Datwyler | G06F 11/2007 713/600 |
| 5,592,631 A | * | 1/1997 | Kelly | G06F 13/364 710/113 |
| 7,043,673 B1 | * | 5/2006 | Ichiriu | G11C 15/00 714/719 |
| 7,620,875 B1 | * | 11/2009 | Nelson | G06F 11/1044 714/763 |

(Continued)

OTHER PUBLICATIONS

Yoon, Doe et al. "Memory mapped ECC: low-cost error protection for last level caches". ISCA'09: Proceedings of the 36th annual international symposium on Computer architecture, Jun. 2009.*

(Continued)

*Primary Examiner* — Steve N Nguyen
(74) *Attorney, Agent, or Firm* — Slater Matsil, LLP

(57) ABSTRACT

A method includes detecting in a communication bus a write command to a first circuit and comparing a write address of the write command with a set of safe addresses. When the write address matches a safe address of the set of safe addresses, an error correction code (ECC) is generated based at least on write data of the write command, and the ECC is stored in a memory of a parameter safe storage circuit. A read command to the first circuit is detected in the communication bus, a read address of the read command is compared with the set of safe addresses, and, when the read address matches a safe address of the set of safe addresses, it is determined whether read data of the read command is corrupted based on the stored ECC, and an error notification is provided when the read data is determined to be corrupted.

20 Claims, 6 Drawing Sheets

(56) References Cited

U.S. PATENT DOCUMENTS

| | | | | |
|---|---|---|---|---|
| 7,958,433 | B1* | 6/2011 | Yoon | G06F 11/08 |
| | | | | 714/774 |
| 8,437,183 | B2* | 5/2013 | Sharon | G06F 11/1072 |
| | | | | 365/185.01 |
| 8,661,317 | B2* | 2/2014 | Jeon | H03M 13/13 |
| | | | | 714/763 |
| 9,189,329 | B1* | 11/2015 | Zhu | G06F 11/1012 |
| 9,558,066 | B2* | 1/2017 | Bonen | G06F 11/1076 |
| 9,612,901 | B2* | 4/2017 | Ruggiero | G06F 11/1048 |
| 9,665,423 | B2* | 5/2017 | Beattie | G06F 3/0619 |
| 9,690,650 | B2* | 6/2017 | Liu | G06F 11/1068 |
| 9,864,654 | B2* | 1/2018 | Vishne | G06F 11/1076 |
| 2008/0263385 | A1* | 10/2008 | Dudeck | G11C 29/846 |
| | | | | 714/2 |
| 2009/0132876 | A1* | 5/2009 | Freking | G11C 29/56008 |
| | | | | 714/723 |
| 2011/0289381 | A1* | 11/2011 | Daga | H03M 13/2906 |
| | | | | 714/763 |
| 2012/0124448 | A1* | 5/2012 | Emerson | G06F 11/1052 |
| | | | | 714/758 |
| 2014/0040512 | A1* | 2/2014 | Fernald | G06F 13/28 |
| | | | | 710/22 |
| 2014/0201597 | A1* | 7/2014 | Hoekstra | G06F 11/10 |
| | | | | 714/764 |
| 2014/0245105 | A1* | 8/2014 | Chung | G06F 11/1076 |
| | | | | 714/763 |
| 2017/0185539 | A1* | 6/2017 | Xu | G06F 21/79 |
| 2019/0332469 | A1* | 10/2019 | Radjai | G06F 9/544 |

OTHER PUBLICATIONS

Texas Instruments, Ghone, C. et al., "ECC/EDC on TDAxx", Application Report, SPRAC42B—Jul. 2016—Revised Jun. 2018, 29 pages.

National Instruments, "What is the ISO 26262 Functional Safety Standard?", http://www.ni.com/white-paper/13647/en/, Apr. 3, 2014, 5 pages.

* cited by examiner top view

SYSTEM AND METHOD FOR TRANSPARENT REGISTER DATA ERROR DETECTION AND CORRECTION VIA A COMMUNICATION BUS

TECHNICAL FIELD

The present invention relates generally to an electronic system and method, and, in particular embodiments, to a system and method for transparent register data error detection and correction (EDC) via a communication bus.

BACKGROUND

Error detection and correction (EDC) may be understood as a technique that enables reliable transfer and retrieval of digital data. EDC includes an error detection portion that allows for the detection of digital errors in, e.g., a digital word. For example, a simple error detection mechanism uses a parity bit (e.g., a bit that is either 1 or 0 to cause the entire digital word to have an even number of 1s) to detect whether a bit of the digital word has been corrupted. Examples of error detection schemes include repetition codes, parity bits, checksums, cyclic redundancy checks (CRCs), and cryptographic hash functions.

EDC also includes an error correction portion that allows for the correction of a bit(s) that has been detected to be corrupted, thereby reconstructing the original digital word. An error correction code (ECC) may be understood as a code that can be used for error detection and error correction. For example, an ECC may add redundant data and/or parity data to a digital word to allow for the reconstruction of the original digital word when such digital word has been corrupted. The capability of the ECC is generally related to the amount of redundancy added. For example, an ECC that is capable of correcting two errors in a digital word generally has more redundancy that an ECC that is capable of correcting a single error in a digital word.

ECC may be used in various applications. For example, an ECC memory is a memory that uses ECCs to detect and correct the most common kinds of internal data corruption.

SUMMARY

In accordance with an embodiment, a method includes: detecting in a communication bus a write command to a first circuit, the write command including a write address and write data; comparing the write address with a set of safe addresses; when the write address matches a safe address of the set of safe addresses, generating an error correction code (ECC) based at least on the write data, and storing the ECC in a memory of a parameter safe storage circuit; detecting in the communication bus a read command to the first circuit, the read command including a read address and read data; comparing the read address with the set of safe addresses; and when the read address matches a safe address of the set of safe addresses, determining whether the read data is corrupted based on the stored ECC, and providing an error notification when the read data is determined to be corrupted.

In accordance with an embodiment, an integrated circuit includes: a communication interface configured to be coupled to a communication bus; a first circuit configured to be coupled to the communication bus; and a parameter safe storage circuit configured to be coupled to the communication bus, the parameter safe storage circuit including a memory and being configured to: detect in the communication bus a write command to the first circuit, the write command including a write address and write data; compare the write address with a set of safe addresses; when the write address matches a safe address of the set of safe addresses, generate an error correction code (ECC) based at least on the write data, and store the ECC in the memory; detect in the communication bus a read command to the first circuit, the read command including a read address and read data; compare the read address with the set of safe addresses; and when the read addresses matches a safe address of the safe addresses, determine whether the read data is corrupted based on the stored ECC, and provide an error notification in response to determining that the read data is corrupted.

In accordance with an embodiment, a parameter safe storage circuit includes a memory, the parameter safe storage circuit configured to be coupled to a communication bus and to: detect in the communication bus a write command, the write command including a write address and write data; compare the write address with a set of safe addresses; when the write address matches a safe address of the set of safe addresses, generate an error correction code (ECC) at least based on the write data, and store the ECC in the memory; detect in the communication bus a read command, the read command including a read address and read data; compare the read address with the set of safe addresses; and when the read addresses matches a safe address of the safe addresses, determine whether the read data is corrupted based on the stored ECC, and provide an error notification in response to determining that the read data is corrupted.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a system and method for transparent register data error detection and correction via an existing bus system interconnect in an integrated circuit. Embodiments of the present invention may be used in other systems, such as in a communication bus coupled to a plurality of integrated circuits, for example.

In an embodiment of the present invention, an integrated circuit having an internal communication bus includes a dedicated parameter safe storage circuit that stores redundant data for implementing an EDC/ECC feature to detect and/or correct errors in configuration data of circuits coupled to the communication bus. By storing the redundant data in a separate location than the configuration data, common cause failures may be advantageously minimized.

Figure 1:
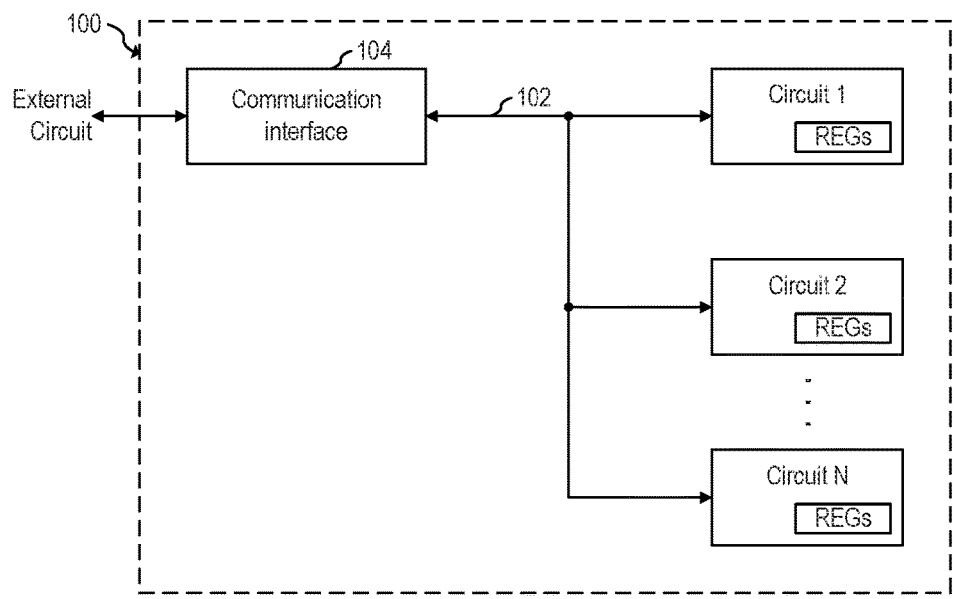
FIG. 1 shows a schematic diagram of an exemplary integrated circuit (IC) having a communication bus.

An integrated circuit generally has a plurality of circuits coupled to a communication bus that is coupled to a communication interface. For example, FIG. 1 shows a schematic diagram of exemplary IC 100 having communication bus 102. IC 100 includes communication bus 102, communication interface 104, and N circuits coupled to communication bus 102, where each of the N circuits has at least one register. Although examples are directed towards writing to circuit 1 and reading from circuit 1, it is understood that other circuits of the circuits 1 to N may also be used.

During normal operation, IC 100 communicates with external circuit via communication interface 104. For example, an external circuit wishing to change a configuration of circuit 1, may issue a write command via communication interface 104, the write command having a write address that corresponds to circuit 1, and write data to be written. When communication interface 104 receives the write command, communication interface generates a corresponding write command for circuit 1 via communication bus 102, where the corresponding write command includes the write address and the write data. Circuit 1 then receives the write command from communication bus 102 and updates the register associated with the write address based on the write data.

An external circuit 203 wishing to read a register from circuit 1 may issue a read command via communication interface 104, such that the read command has a read address that corresponds to circuit 1. When communication interface 104 receives the read command, communication interface generates a corresponding read command for circuit 1 via communication bus 102, where the corresponding read command includes the read address. Circuit 1 then receives the read command from communication bus 102 and transmits read data back to communication interface 104 from a register of circuit 1 based on the read address. Communication interface 104 then receives read data from communication bus 102 and sends the corresponding read data to the external circuit 203.

Functional safety of an integrated circuit is generally important. In some applications, such as in automotive applications, the functional safety of at least some aspects of an integrated circuit may be critical. For example, some safety standards, such as the ISO 26262 standard, have minimum failures rate requirements.

A failure of an integrated circuit may occur as a result of a register having one or more bits corrupted, for example. The corruption of data in a register may occur, e.g., as a result of an error in the write operation, or are as failure of the memory cells of the register.

In an embodiment of the present invention, a dedicated parameter safe storage circuit includes a single ECC generator and a single checker to detect and correct corrupted data in any of the circuits coupled to the communication bus regardless of the number of circuits coupled to the communication bus. The parameter safe storage circuit may be disposed in an area of the IC that is separate from the area occupied by any of the other circuits coupled to the communication bus.

Figure 2:
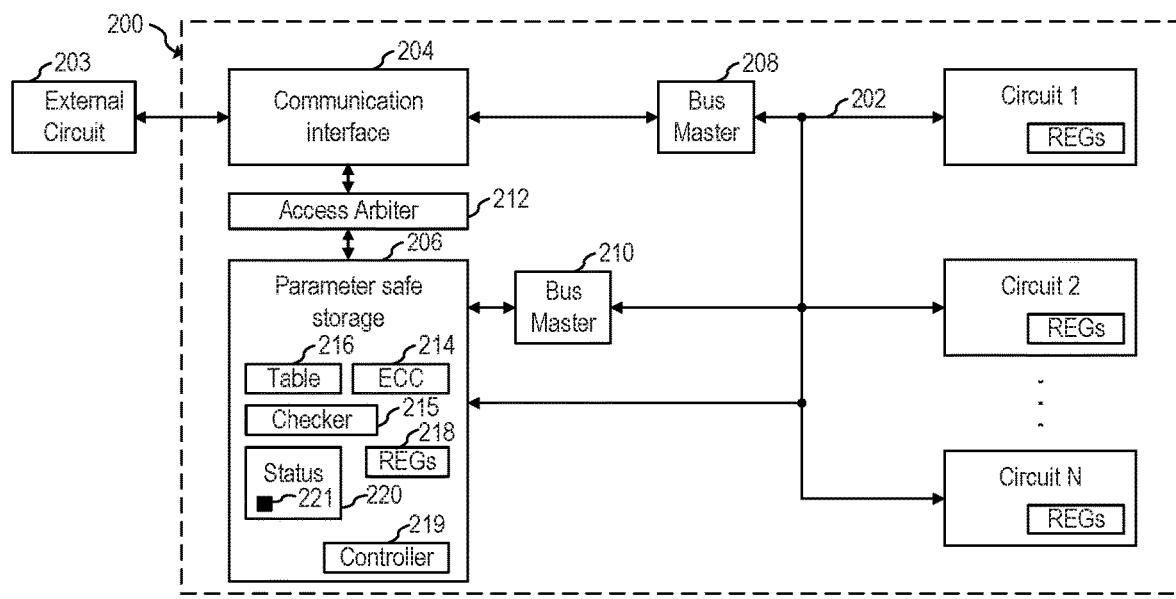
FIG. 2 shows a schematic diagram of an IC having a communication bus, according to an embodiment of the present invention.

FIG. 2 shows a schematic diagram of IC 200 having communication bus 202, according to an embodiment of the present invention. IC 200 includes communication bus 202, communication interface 204, parameter safe storage circuit 206, bus masters 208 and 210, access arbiter 212, and N circuits coupled to communication bus 202, where each of the N circuits has at least one register. Parameter safe storage circuit 206 includes one or more registers 218, ECC encoder 214, checker 215, and lookup table 216.

Communication bus 202 may be implemented as an advanced peripheral bus (APB) or an advanced high performance bus (AHB), for example. Other communication bus implementations, such as other parallel communication bus architectures may also be used. Communication bus 202 may be implemented in any way known in the art.

Bus masters 208 and 210 are capable of initiating communication with one or more of circuits 1 to N via communication bus 202. Bus masters 208 and 210 may be implemented in any way known in the art. For example, in an APB bus, bus masters 208 and 210 may be implemented as APB masters.

Access arbiter 212 is configured to determine whether communication bus 202 is busy or not busy (inactive). When communication bus 202 is busy, communication bus 202 causes other bus masters to not use communication bus 202 while busy. For example, if communication bus 202 is busy because bus master 208 is issuing a write command, then access arbiter 212 causes bus master 210 to not use communication bus 202 while busy. Access arbiter 212 may be implemented in any way known the art.

Communication interface 204 may be implemented as a serial peripheral interface (SPI). Other communication interfaces, such as inter-integrated circuit ($I^2C$), inter-IC sound ($I^2S$) interface, universal asynchronous receiver-transmitter (UART) interface, and others, may also be used. Communication interface 204 may be implemented in any way known in the art.

IC 200 may be implemented in a monolithic semiconductor substrate. In some embodiments, IC 200 may be implemented as a multi-chip device in a single package.

Circuits 1 to N are coupled to communication bus 202. In some embodiments, N is equal to 1 (i.e., a single circuit is coupled to communication bus 202. In other embodiments, N is greater than 1, such as 2, 5, 10, 16, or more. Circuits 1 to N may be identical to each other or different from each other. In some embodiments, some circuits of circuits 1 to N are identical while others are different. One or more of circuits 1 to N may include analog-to-digital converters (ADCs), digital-to-analog converters (DACs), reference circuits, such as reference currents and voltages, state machines, such as for generating pulse-width modulation (PWM), non-volatile memories, etc. Circuits 1 to N may be implemented in any way known in the art.

Each of circuits 1 to N has at least one register. In some circuits of circuits 1 to N, all of the registers may be safety critical. In some circuits of circuits 1 to N, at least one but not all of the registers may be safety critical. In some circuits of circuits 1 to N, none of the registers may be safety critical.

Lookup table 216 is configured to store the address of safety critical registers. In some embodiments, lookup table 216 includes information in one-time programmable (OTP) memory that is programmed during manufacturing. In other embodiments, lookup table 216 may be reconfigured after IC 200 is installed in a user device. Lookup table 216 may be implemented in any way known in the art. In some embodiments, embodiment error correcting systems and method are applied to the circuits that have been designated as being safety critical and not to the circuits that have not been designated as safety critical.

Controller 219 may implement or control various actions of parameter safe storage, such as issuing read commands, write commands, storing data into registers 218, setting bits in status register 221, directing ECC encoder 214 to generate ECC codes, direct checker 215 to check for validity of data, and reading from lookup table 216, among others. Controllers 219 may include a finite state machine (FSM). Other implementations are also possible.

During normal operation, IC 200 communicates with external circuits via communication interface 204. For example, FIGS. 3 and 4 show a schematic diagram of IC 200 illustrating communication behavior during a write operation and subsequent read operation, respectively, according to an embodiment of the present invention.

Figure 3:
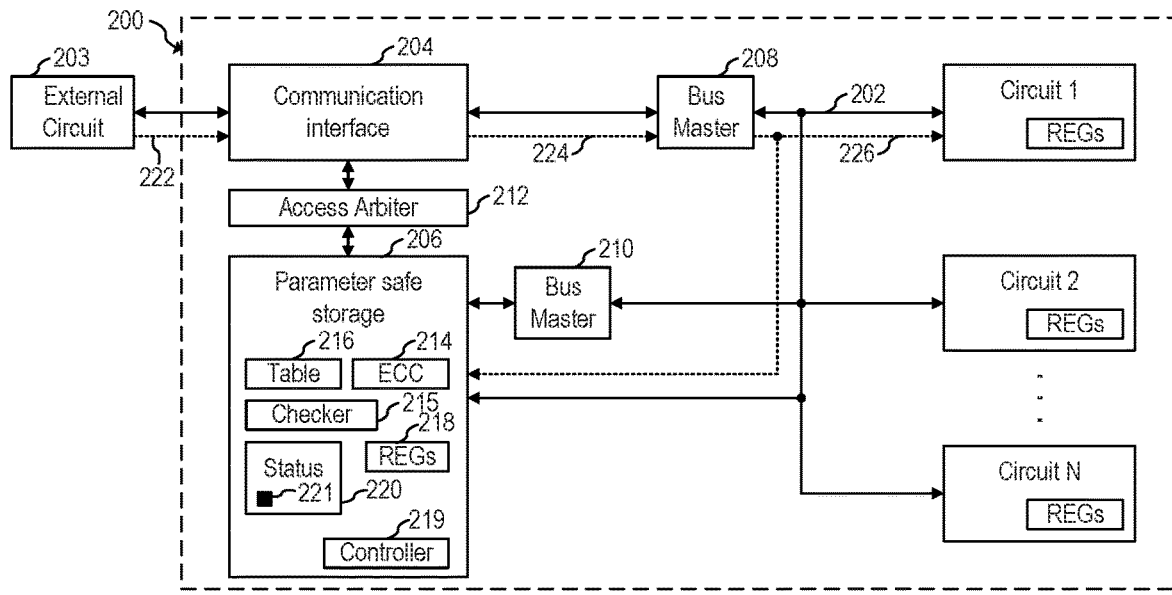
FIGS. 3 and 4 show a schematic diagram of the IC of FIG. 2 illustrating communication behavior during a write operation and subsequent read operation, respectively, according to an embodiment of the present invention.

As shown in FIG. 3, an external circuit 203 wishing to change a configuration of circuit 1, may issue write command 222 via communication interface 204. Write command 222 may include a write address that corresponds to circuit 1, as well as write data to be written. Communication interface 204 receives write command 222 and generates internal write command 224. Next, bus master 208 received internal write command 224 and generates internal write command 226 via communication bus 202, which is received by circuit 1. Write command 226 includes the write address and the write data. Circuit 1 then receives write command 226 from communication bus 202 and updates the register associated with the write address based on the write data.

Parameter safe storage circuit 206 monitors communication bus 202 and identifies write address and write data from write command 226. Parameter safe storage circuit 206 then determines whether the write address of write command 226 is a safe address based on lookup table 216. If the write address of write command 226 is a safe address, ECC encoder 214 then generates an ECC based on the write data and stores such ECC in registers 218.

Figure 4:
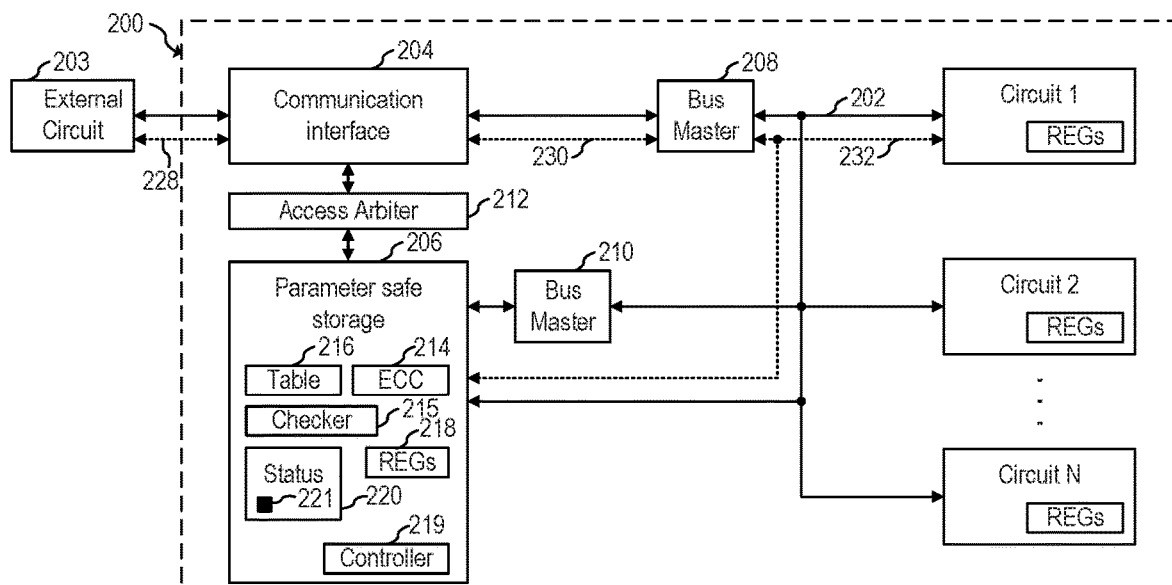

As shown in FIG. 4, external circuit 203 may issue read command 228 via communication interface 204 a time after issuing write command 222. The read command 228 may include a read address equal to the write address of write command 222. When communication interface 204 receives read command 228, communication interface generates internal read command 230. Bus master 208 receives internal read command 230, and then generates read command 232 via communication bus 202, where read command 232 includes the read address. Circuit 1 then receives read command 232 from communication bus 202 and transmits back read data to communication interface 204 from the register of circuit 1 based on the read address. Communication interface 204 then receives such read data from communication bus 202 and sends a corresponding read data to the external circuit 203.

Parameter safe storage circuit 206 monitors communication bus 202 and identifies read address of read command 232 and corresponding read data. Parameter safe storage circuit 206 then determines whether the read address of read command 232 is a safe address based on lookup table 216. If the read address of read command 232 is a safe address, checker 215 is used to determine whether the read data has been corrupted based on the ECC stored in registers 218. If checker 215 determines that the read data is corrupted, parameter safe storage circuit 206 sets error flag 221 in status register 220 to indicate that a failure has occurred. In some embodiments, parameter safe storage circuit 206 may indicate a failure to the external circuit 203 via a separate pin (not shown), instead of, or in addition to using the status register 220.

In some embodiments, status register 220 is located outside parameter safe storage circuit 206 and coupled to communication bus 202. In such embodiments, setting the error flag 221 in status register 220 includes parameter safe storage circuit 206 issuing a write command via bus master 210 to status register 220 when communication bus 220 is not busy.

It is understood that the external circuit issuing read command 228 may be the same or different than the external circuit issuing write command 222.

Figure 5:
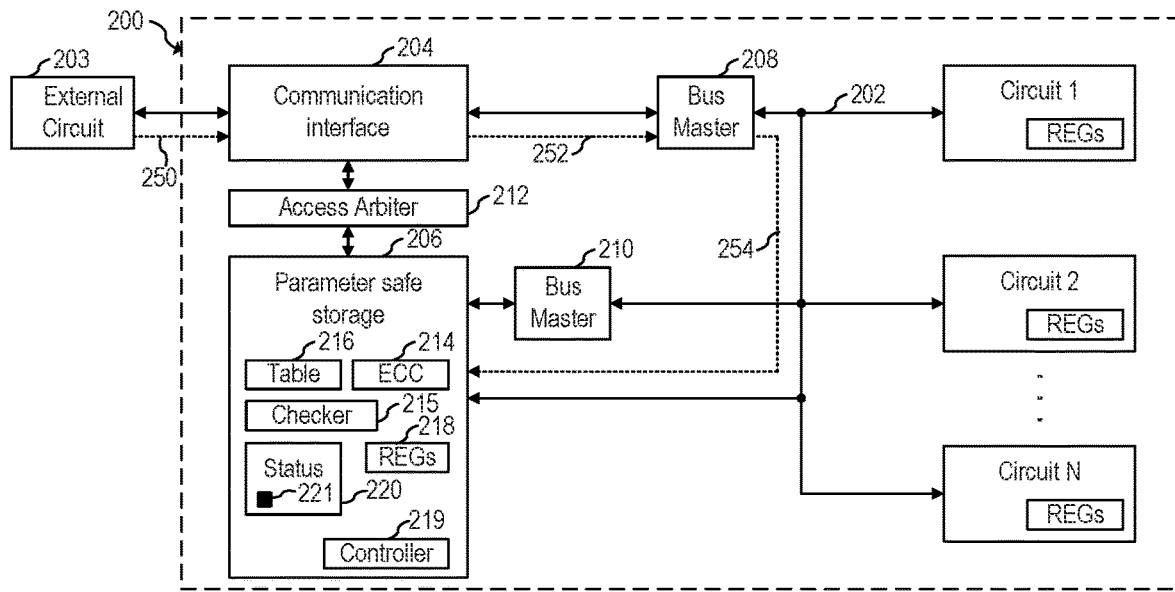
FIG. 5 shows a schematic diagram of the IC of FIG. 2 illustrating communication behavior during a status read operation, according to an embodiment of the present invention.

FIG. 5 shows a schematic diagram of IC 200 illustrating communication behavior during a status read operation, according to an embodiment of the present invention. As shown in FIG. 5, an external circuit may check whether a failure has occurred in data of one or more of circuits 1 to N by reading status register 220. For example, external circuit 203 may issue status read command 250 via communication interface 204, where the status read command 250 has a status read address.

When communication interface 204 receives read command 250, communication interface 204 generates status read command 252. Bus master 208 receives status read command 252 and generates read command 254, where read command 254 includes the status read address. Parameter safe storage circuit 206 then receives status read command 256 and transmits back to communication interface 204 status read data from the status register 220 based on the status read address. Communication interface 204 then receives such status read data from communication bus 202 and sends a corresponding read data to the external circuit 203.

Advantages of some embodiments include the ability to detect corrupted data associated with safety critical registers of circuits 1 to N without using a microcontroller, such as a dedicated microcontroller. Since the parameter safe storage circuit monitors read commands and write commands already issued in the communication bus, it is advantageously possible to detect corrupted data without consuming any additional bandwidth of the communication bus.

It is a common practice in the design of integrated circuits that a particular circuit, such as an ADC is designed once and then reused in multiple integrated circuits, such as a stand-alone ADC IC, an ADC inside a general purpose power management IC (PMIC) and an ADC inside an automotive PMIC, for example. Each particular circuit generally undergoes an extensive simulation, testing, verification and qualification process. By using a dedicated parameter safe storage circuit, it is advantageously possible to design, e.g., a single ADC block, and use such ADC block for a general purpose PMIC and for an automotive PMIC without modification, where the automotive PMIC also includes a parameter safe storage circuit, instead of designing an ADC with ECC functionality that will not be used in the general PMIC (thus unnecessarily increasing cost and complexity) or designing two different ADC modules (thus unnecessarily incurring redesign efforts). Therefore, using a dedicated parameter safe storage circuit may advantageously result in reduced area overhead. Redundant verification, testing, and qualification may also be avoided. Using a dedicated parameter safe storage circuits advantageously allows for designing of circuits, such as an ADC, without having to first decide whether an EDC/ECC mechanism is to be implemented in such circuit. Additional advantages include the ability to detect corrupted data in any of a plurality of circuits coupled to a communication bus with a single ECC encoder.

Figure 6:
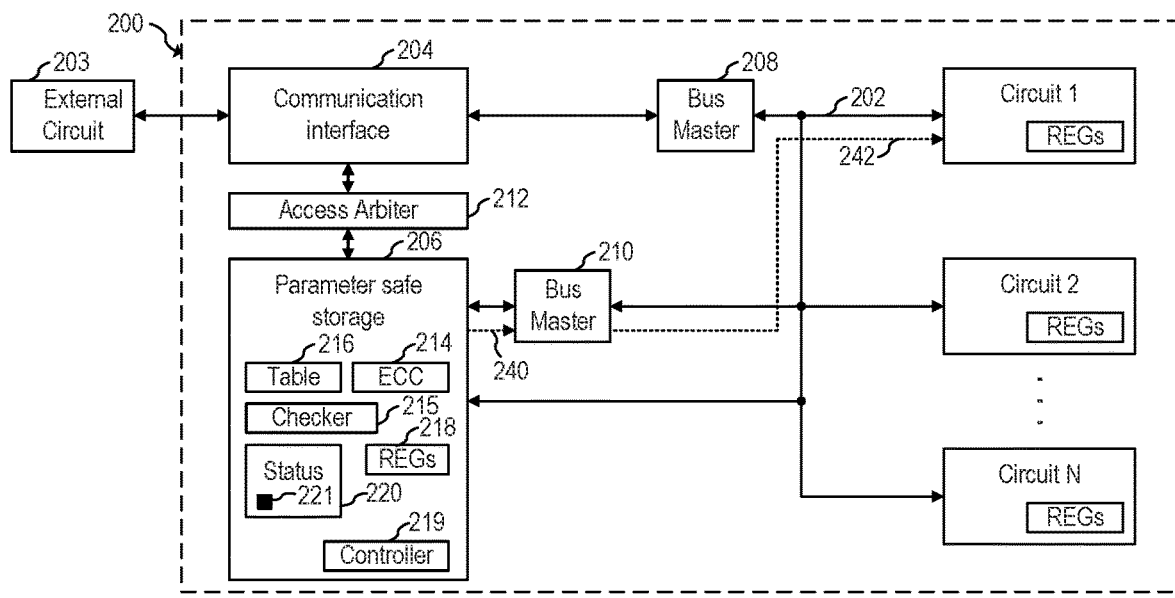
FIG. 6 shows a schematic diagram of the IC of FIG. 2 illustrating communication behavior during a data correction operation, according to an embodiment of the present invention.

In some embodiments, parameter safe storage circuit 206 may correct corrupted data. For example, FIG. 6 shows a schematic diagram of IC 200 illustrating communication behavior during a data correction operation, according to an embodiment of the present invention.

During normal operation, when parameter safe storage circuit 206 detects that data is corrupted, e.g., in circuit 1, parameter safe storage circuit 206 may correct such corrupted data. Parameter safe storage circuit 206 may correct corrupted data by using the ECC that was created when the original data was written to generates corrected data, and issuing a write command having a write address that corresponds to the address of the corrupted data and write data corresponding to the corrected data. For example, to correct corrupted data, parameter safe storage may issue write command 240. Bus master 210 then receives write command 240 and generates write command 242 when communication bus 202 is not busy, write command 242 having a write address corresponding to the address of the corrupted data, and corrected write data. Circuit 1 then receives the write command from communication bus 202 and updates the register associated with the write address based on the corrected write data.

Figure 7:
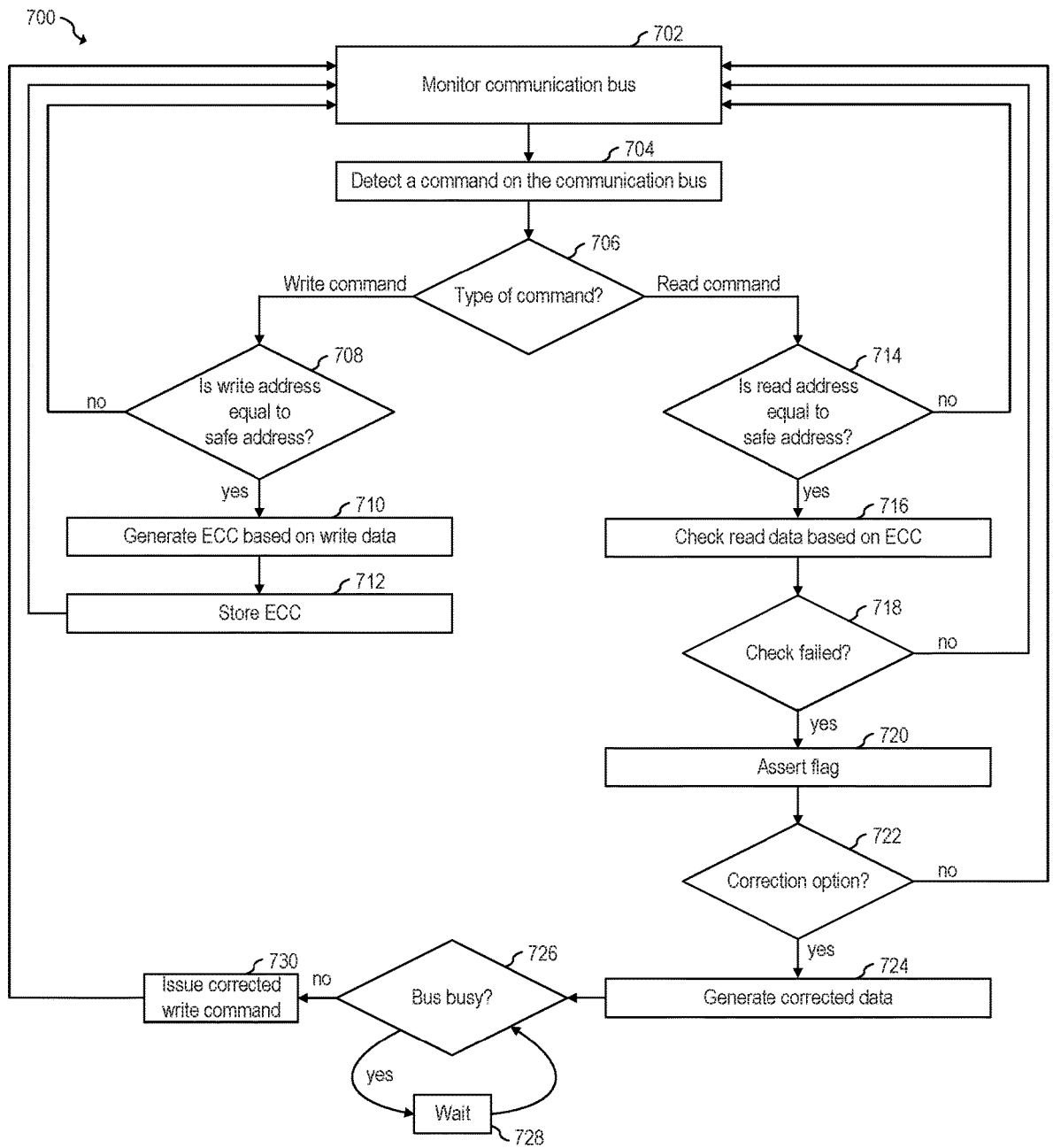
FIG. 7 shows a flowchart of an embodiment method for transparent register data error detection and correction via a communication bus, according to an embodiment of the present invention.

FIG. 7 shows a flowchart of embodiment method 700 for transparent register data error detection and correction via a communication bus, according to an embodiment of the present invention. Method 700 may be implemented, for example, by IC 200. In some embodiments, at least portions or all of method 700 may be implemented or controlled by controller 219. Other circuits, including other integrated circuits and other circuits that include multiple packaged ICs may implement method 700.

During step 702, a parameter safe storage circuit monitors a communication bus. In some embodiments, the parameter safe storage circuit may be implemented using parameter safe storage circuit 206, and the communication bus may be implemented using communication bus 202. During step 704, the parameter safe storage circuit detects a command in the communication bus. During step 706, the type of command is determined. The command may be, for example, a read command or a write command.

If the command detected during step 706 is a write command, a write address of the write command is compared with a set of safe addresses during step 708. The set of safe addresses may be stored, for example, in a lookup table. If the write address does not match any of the safe addresses in the set of safe addresses, the parameter safe storage circuit continues monitoring the communication bus during step 702.

If the write address matches one of the safe addresses in the set of safe addresses, an ECC is generated based on the write data during step 710. During step 712, the ECC is stored, e.g., in volatile or non-volatile memory in associating with the write address. The parameter safe storage circuit then continues monitoring the communication bus during step 702.

In some embodiments, the ECC is capable of detecting one or more errors in the write data. In some embodiments, the ECC is not capable of correcting errors in the write data. In other embodiments, the ECC is capable of detecting and correcting one or more errors in the write data.

If the command detected during step 706 is a read command, a read address of the read command is compared with a set of safe addresses during step 714. If the read address does not match any of the safe addresses in the set of safe addresses, the parameter safe storage circuit continues monitoring the communication bus during step 702.

If the read address matches one of the safe addresses in the set of safe addresses, the read data is checked during step 716 to verify that it has not been corrupted based on the stored ECC that is associated with the read address. If no failure is detected during step 718, then the read data is determined to be valid and the parameter safe storage circuit continues monitoring the communication bus during step 702. If a failure is detected during step 718, then an error flag is asserted during step 720. The error flag may be signaled by setting a status bit in a status register and/or by asserting a signal on a pin of the IC, for example. In some embodiments, error notification may be achieved in other ways.

If the parameter safe storage circuit is not configured to correct the corrupted data (step 722), then the parameter safe storage circuit continues monitoring the communication bus during step 702. If the parameter safe storage circuit is configured to correct the corrupted data (step 722), the corrected data is generated during step 724 based on the ECC associated with the read address. During step 726, an access arbiter determines whether the communication bus is busy or not. If the communication bus is busy, then the IC waits until the communication bus becomes free (not busy) during step 728. Once the communication bus is not busy, a corrected write command is issued during step 730 over the communication bus to rewrite the corrupted data with corrected data. The parameter safe storage circuit then continues monitoring the communication bus during step 702.

Advantages of some embodiments include that a user of an IC may perform error detection and correction of, e.g., safety critical data in a transparent manner and without having to transmit redundant information (e.g., a checksum code or parity bits) through the communication bus (either the external communication bus or communication bus internal to the IC). In some embodiments, the correction of corrupted data may occur before the external circuit becomes aware that an error occurred.

Figure 8:
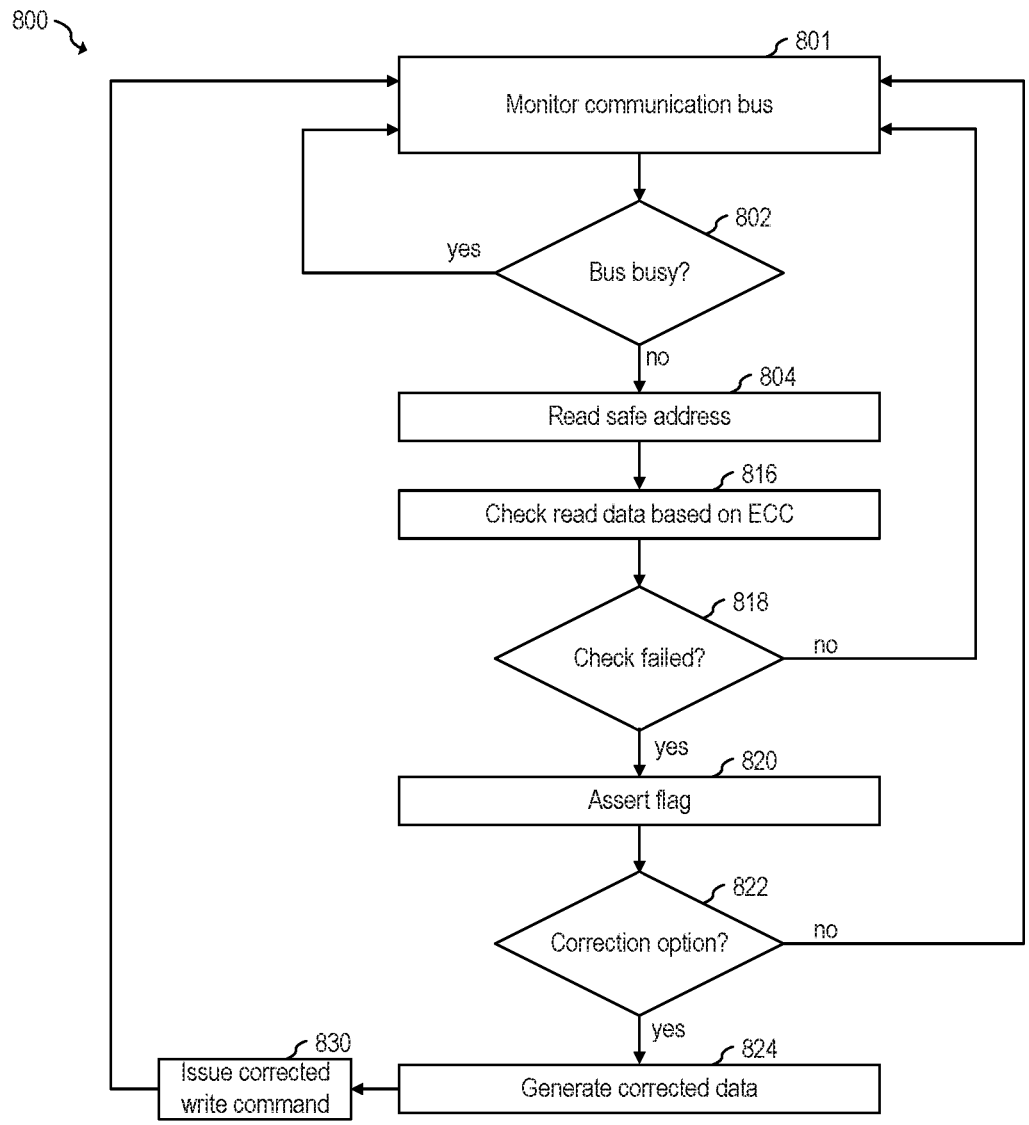
FIG. 8 shows a flowchart of an embodiment method for performing error detection and correction of safety registers in circuits coupled to a communication bus, according to an embodiment of the present invention.
Figure 9:
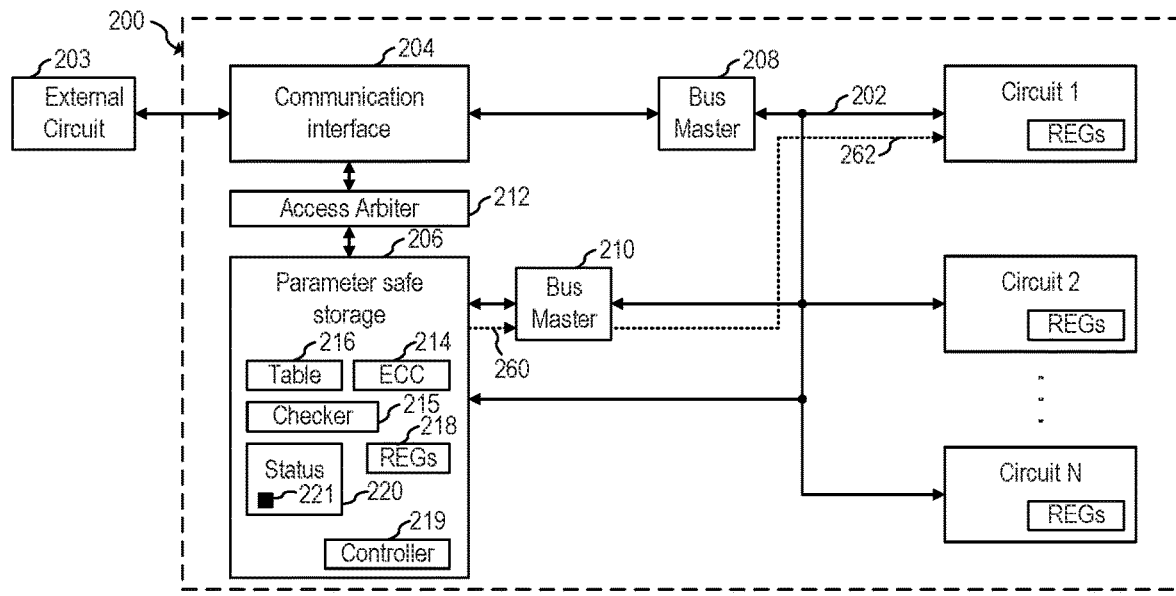
FIG. 9 shows a schematic diagram of the IC of FIG. 2 illustrating communication behavior during a data checking operation, according to an embodiment of the present invention.

In some embodiments, a data check is performed to detect data errors when communication bus 202 is not busy. In some embodiments, the errors may be corrected during the data check. For example, FIG. 8 shows a flowchart of embodiment method 800 for performing error detection and correction of safety registers in circuits coupled to a communication bus, according to an embodiment of the present invention. Method 700 may be implemented, for example, by IC 200. In some embodiments, at least portions or all of method 700 may be implemented or controlled by controller 219. Other circuits, including other integrated circuits and other circuits that include multiple packaged ICs may implement method 700. FIG. 9 shows a schematic diagram of IC 200 illustrating communication behavior during a data checking operation, according to an embodiment of the present invention. FIG. 8 may be understood in view of FIGS. 9 and 6.

During step 801, a communication bus, such as communication bus 202, is monitored, e.g., by a parameter safe storage circuit, such as parameter safe storage circuit 206, e.g., in a similar manner as in step 702. During step 802, the communication bus is determined to be busy or not busy. If the communication bus is busy, the parameter safe storage circuit continues monitoring the communication bus during step 801 for commands on the communication bus according to, e.g., method 700.

If the communication bus is not busy, the parameter safe storage circuit then issues a read command during step 804. For example, as shown in FIG. 9, parameter safe storage circuit 206 may issue read command 260 to bus master 210, which then issues read command 262 having the read address corresponding to a safe address of the set of safe addresses. Parameter safe storage circuit 206 then receives read data in from circuit 1 in response to the read command.

The read data is checked during step 816 to verify that the read data has not been corrupted based on the stored ECC that is associated with the read address. If it is determined during step 818 that the check passed, then the read data is determined to be not corrupted and the parameter safe storage circuit continues monitoring the communication bus during step 702. If it is determined during step 818 that the check failed, then an error flag is asserted during step 820.

If the parameter safe storage circuit is not configured to correct the corrupted data (step 822), then the parameter safe storage circuit continues monitoring the communication bus during step 702. If the parameter safe storage circuit is configured to correct the corrupted data (step 822), the corrected data is generated during step 824 based on the ECC associated with the read address, e.g., using an extended Hamming code with 2 bits error detection and single bit error correction. Other ECC techniques may also be used.

A corrected write command is then issued during step 830 over the communication bus to rewrite the corrupted data with corrected data. For example, as shown in FIG. 6, parameter safe storage circuit 206 may issue write command 240 to bus master 210, which then issues write command 242 having the read address corresponding to a safe address of the set of safe addresses. Circuit 1 then receives the write command from communication bus 202 and updates the register associated with the write address based on the corrected data.

After step 830, the parameter safe storage circuit then continues monitoring the communication bus during step.

Figure 10:
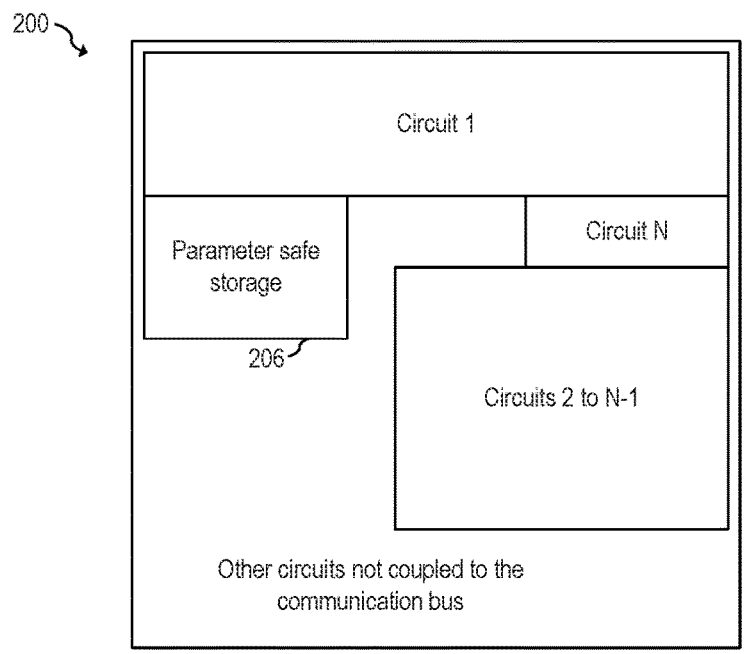
FIG. 10 shows a layout of the IC of FIG. 2, according to an embodiment of the present invention.

FIG. 10 shows a layout of IC 200, according to an embodiment of the present invention. As shown by FIG. 10, parameter safe storage circuit 206 is located in an area of IC 200 that is separate from any of circuits 1 to N coupled to the communication bus. Other implementations are also possible. As discussed above, one or more of circuits 1 to N may include analog-to-digital converters (ADCs), digital-to-analog converters (DACs), reference circuits, such as reference currents and voltages, state machines, such as for generating pulse-width modulation (PWM), non-volatile memories, etc. N may be equal to 1 or higher.

Example embodiments of the present invention are summarized here. Other embodiments can also be understood from the entirety of the specification and the claims filed herein.

Example 1

A method including: detecting in a communication bus, by a parameter safe storage circuit, a write command to a first circuit, the write command including a write address and write data, the first circuit being different than the parameter safe storage circuit; comparing, by the parameter safe storage circuit, the write address with a set of safe addresses; when the write address matches a safe address of the set of safe addresses, generating, by the parameter safe storage circuit, an error correction code (ECC) based at least on the write data, and storing the ECC in a memory of the parameter safe storage circuit; detecting in the communication bus, by the parameter safe storage circuit, a read command to the first circuit, the read command including a read address and read data; comparing, by the parameter safe storage circuit, the read address with the set of safe addresses; and when the read address matches a safe address of the set of safe addresses, determining, by the parameter safe storage circuit, whether the read data is corrupted based on the stored ECC, and providing an error notification when the read data is determined to be corrupted.

Example 2

The method of example 1, further including: detecting, in the communication bus, by the parameter safe storage circuit, a second write command to a second circuit, the second write command including a second write address and second write data; comparing, by the parameter safe storage circuit, the second write address with the set of safe addresses; when the second write address matches a safe address of the set of safe addresses, generating, by the parameter safe storage circuit, a second ECC based at least on the second write data, and storing the second ECC in the memory of the parameter safe storage circuit; detecting in the communication bus, by the parameter safe storage circuit, a second read command to the second circuit, the second read command including a second read address and second read data; comparing, by the parameter safe storage circuit, the second read address with the set of safe addresses; and when the second read address matches a safe address of the set of safe addresses, determining, by the parameter safe storage circuit, whether the second read data is corrupted based on the stored second ECC, and providing the error notification when the second read data is determined to be corrupted.

Example 3

The method of one of examples 1 or 2, further including: determining, by the parameter safe storage circuit, whether the communication bus is inactive; and when the communication bus is inactive: issuing, by the parameter safe storage circuit, a safe read command to a safe address of the first circuit via the communication bus, in response to the issuing of the safe read command, receiving, by the parameter safe storage circuit, safe read data from the first circuit via the communication bus, reading from the memory of the parameter safe storage circuit a safe ECC associated with the safe address of the first circuit, determining whether the safe read data is corrupted based on the safe ECC, and providing an error notification when the safe read data is determined to be corrupted.

Example 4

The method of one of examples 1 to 3, further including: correcting the safe read data using the safe ECC; and writing the corrected safe read data in the safe address of the first circuit via the communication bus.

Example 5

The method of one of examples 1 to 4, where correcting the safe read data includes using an extended Hamming code.

Example 6

The method of one of examples 1 to 5, where correcting the safe read data includes correcting more than one error in the safe read data.

Example 7

The method of one of examples 1 to 6, where the communication bus is a parallel bus.

Example 8

The method of one of examples 1 to 7, where the first circuit is arranged in a first integrated circuit, and where the parameter safe storage circuit is arranged in a second integrated circuit different from the first integrated circuit.

Example 9

An integrated circuit including: a communication interface configured to be coupled to a communication bus; a first circuit configured to be coupled to the communication bus; and a parameter safe storage circuit configured to be coupled to the communication bus, the parameter safe storage circuit including a memory and being configured to: detect in the communication bus a write command to the first circuit, the write command including a write address and write data; compare the write address with a set of safe addresses; when the write address matches a safe address of the set of safe addresses, generate an error correction code (ECC) based at least on the write data, and store the ECC in the memory; detect in the communication bus a read command to the first circuit, the read command including a read address and read data; compare the read address with the set of safe addresses; and when the read addresses matches a safe address of the safe addresses, determine whether the read data is corrupted based on the stored ECC, and provide an error notification in response to determining that the read data is corrupted.

Example 10

The integrated circuit of example 9, where the first circuit is located in a first area of the integrated circuit, and where the parameter safe storage circuit is located in a second area of the integrated circuit, the second area being outside the first area.

Example 11

The integrated circuit of one of examples 9 or 10, further including a second circuit configured to be coupled to the communication bus.

Example 12

The integrated circuit of one of examples 9 to 11, further including a one-time programmable memory configured to store the set of safe addresses.

Example 13

The integrated circuit of one of examples 9 to 12, where the communication interface includes a serial peripheral interface.

Example 14

The integrated circuit of one of examples 9 to 13, where the communication bus is one of an advanced peripheral bus or an advanced high performance bus.

Example 15

The integrated circuit of one of examples 9 to 14, where the communication bus is an advanced peripheral bus and the integrated circuit further includes: a first peripheral bus master coupled between the communication interface and the first circuit; and a second peripheral bus master coupled between the communication interface and the parameter safe storage circuit.

Example 16

The integrated circuit of one of examples 9 to 15, further including the communication bus coupled to the communication interface, the first circuit, and the parameter safe storage circuit.

Example 17

The integrated circuit of one of examples 9 to 16, further including an access arbiter coupled to the communication interface and to the parameter safe storage circuit, the access arbiter configured to determine whether the communication bus is busy.

Example 18

A parameter safe storage circuit including a memory, the parameter safe storage circuit configured to be coupled to a communication bus and to: detect in the communication bus a write command, the write command including a write address and write data; compare the write address with a set of safe addresses; when the write address matches a safe address of the set of safe addresses, generate an error correction code (ECC) at least based on the write data, and store the ECC in the memory; detect in the communication bus a read command, the read command including a read address and read data; compare the read address with the set of safe addresses; and when the read addresses matches a safe address of the safe addresses, determine whether the read data is corrupted based on the stored ECC, and provide an error notification in response to determining that the read data is corrupted.

Example 19

The parameter safe storage circuit of example 18, further including a one-time programmable memory configured to store the set of safe addresses.

Example 20

The parameter safe storage circuit of one of examples 18 or 19, where the parameter safe storage circuit is configured to provide the error notification by asserting an error flag in a register accessible via the communication bus.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   detecting in a communication bus, by a parameter safe storage circuit, a write command to a first circuit, the write command comprising a write address and write data, the first circuit being different than the parameter safe storage circuit;
   comparing, by the parameter safe storage circuit, the write address with a set of predefined addresses;
   when the write address matches a predefined address of the set of predefined addresses,
      generating, by the parameter safe storage circuit, an error correction code (ECC) based at least on the write data, and
      storing the ECC in a memory of the parameter safe storage circuit and not in the first circuit;
   detecting in the communication bus, by the parameter safe storage circuit, a read command to the first circuit, the read command comprising a read address and read data;
   comparing, by the parameter safe storage circuit, the read address with the set of predefined addresses; and
   when the read address matches a predefined address of the set of predefined addresses,
      determining, by the parameter safe storage circuit, whether the read data is corrupted based on the stored ECC, and
      providing an error notification when the read data is determined to be corrupted.

2. The method of claim 1, further comprising:
   detecting, in the communication bus, by the parameter safe storage circuit, a second write command to a second circuit, the second write command comprising a second write address and second write data;
   comparing, by the parameter safe storage circuit, the second write address with the set of predefined addresses;
   when the second write address matches a predefined address of the set of predefined addresses,
      generating, by the parameter safe storage circuit, a second ECC based at least on the second write data, and
      storing the second ECC in the memory of the parameter safe storage circuit;
   detecting in the communication bus, by the parameter safe storage circuit, a second read command to the second circuit, the second read command comprising a second read address and second read data;
   comparing, by the parameter safe storage circuit, the second read address with the set of predefined addresses; and
   when the second read address matches a predefined address of the set of predefined addresses,
      determining, by the parameter safe storage circuit, whether the second read data is corrupted based on the stored second ECC, and
      providing the error notification when the second read data is determined to be corrupted.

3. The method of claim 1, further comprising:
   determining, by the parameter safe storage circuit, whether the communication bus is inactive; and
   when the communication bus is inactive:
      issuing, by the parameter safe storage circuit, a parameter safe storage circuit read command to a predefined address of the first circuit via the communication bus,
      in response to the issuing of the parameter safe storage circuit read command, receiving, by the parameter safe storage circuit, third read data from the first circuit via the communication bus,
      reading from the memory of the parameter safe storage circuit a safe ECC associated with the predefined address of the first circuit,
      determining whether the third read data is corrupted based on the safe ECC, and
      providing the error notification when the third read data is determined to be corrupted.

4. The method of claim 3, further comprising:
   correcting the third read data using the safe ECC; and
   writing the corrected third read data in the predefined address of the first circuit via the communication bus.

5. The method of claim 4, wherein correcting the third read data comprises using an extended Hamming code.

6. The method of claim 4, wherein correcting the third read data comprises correcting more than one error in the third read data.

7. The method of claim 1, wherein the communication bus is a parallel bus.

8. The method of claim 1, wherein the first circuit is arranged in a first integrated circuit, and wherein the parameter safe storage circuit is arranged in a second integrated circuit different from the first integrated circuit.

9. An integrated circuit comprising:
   a communication interface configured to be coupled to a communication bus;
   a first circuit configured to be coupled to the communication bus; and a parameter safe storage circuit configured to be coupled to the communication bus, the parameter safe storage circuit comprising a memory and being configured to:
  detect in the communication bus a write command to the first circuit, the write command comprising a write address and write data;
  compare the write address with a set of predefined addresses;
  when the write address matches a predefined address of the set of predefined addresses,
    generate an error correction code (ECC) based at least on the write data, and
    store the ECC in the memory and not in the first circuit;
  detect in the communication bus a read command to the first circuit, the read command comprising a read address and read data;
  compare the read address with the set of predefined addresses; and
  when the read address matches a predefined address of the predefined addresses,
    determine whether the read data is corrupted based on the stored ECC provide an error notification in response to determining that the read data is corrupted.

10. The integrated circuit of claim 9, wherein the first circuit is located in a first area of the integrated circuit, and wherein the parameter safe storage circuit is located in a second area of the integrated circuit, the second area being outside the first area.

11. The integrated circuit of claim 9, further comprising a second circuit configured to be coupled to the communication bus.

12. The integrated circuit of claim 9, further comprising a one-time programmable memory configured to store the set of predefined addresses.

13. The integrated circuit of claim 9, wherein the communication interface comprises a serial peripheral interface.

14. The integrated circuit of claim 9, wherein the communication bus is one of an advanced peripheral bus or an advanced high performance bus.

15. The integrated circuit of claim 14, wherein the communication bus is the advanced peripheral bus and the integrated circuit further comprises:

a first peripheral bus master coupled between the communication interface and the first circuit; and
a second peripheral bus master coupled between the communication interface and the parameter safe storage circuit.

16. The integrated circuit of claim 9, further comprising the communication bus coupled to the communication interface, the first circuit, and the parameter safe storage circuit.

17. The integrated circuit of claim 9, further comprising an access arbiter coupled to the communication interface and the parameter safe storage circuit, the access arbiter configured to determine whether the communication bus is busy.

18. A parameter safe storage circuit comprising a memory, the parameter safe storage circuit configured to be coupled to a communication bus and to:
  detect in the communication bus a write command for a first circuit, the write command comprising a write address and write data;
  compare the write address with a set of predefined addresses;
  when the write address matches a predefined address of the set of predefined addresses,
    generate an error correction code (ECC) at least based on the write data, and
    store the ECC in the memory and not in the first circuit;
  detect in the communication bus a read command for the first circuit, the read command comprising a read address and read data;
  compare the read address with the set of predefined addresses; and
  when the read addresses matches a predefined address of the predefined addresses, determine whether the read data is corrupted based on the stored ECC.

19. The parameter safe storage circuit of claim 18, further comprising a one-time programmable memory configured to store the set of predefined addresses.

20. The parameter safe storage circuit of claim 18, wherein the parameter safe storage circuit is configured to provide an error notification by asserting an error flag in a register accessible via the communication bus.

* * * * *